United States Patent
Sugimori et al.

(10) Patent No.: US 8,467,172 B2
(45) Date of Patent: Jun. 18, 2013

(54) MOBILE TERMINAL DEVICE

(75) Inventors: Kenta Sugimori, Kawasaki (JP);
Toshikazu Ishioka, Kawasaki (JP);
Manabu Matsushima, Kawasaki (JP);
Yoshifumi Kajiwara, Kawasaki (JP);
Hiroyuki Takita, Kawasaki (JP);
Kazunobu Yoneyama, Kawasaki (JP);
Hiroshi Kubo, Kawasaki (JP);
Yoshifumi Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 4 days.

(21) Appl. No.: 12/401,197

(22) Filed: Mar. 10, 2009

(65) Prior Publication Data
US 2009/0244834 A1 Oct. 1, 2009

(30) Foreign Application Priority Data
Mar. 31, 2008 (JP) .................. 2008-093086

(51) Int. Cl.
*H05K 5/00* (2006.01)
*G06F 1/16* (2006.01)
*H04M 1/00* (2006.01)
*H04M 1/22* (2006.01)
*F21V 33/00* (2006.01)

(52) U.S. Cl.
USPC ............ 361/679.01; 361/679.55; 361/679.56; 455/566; 455/567; 362/85; 362/88

(58) Field of Classification Search
USPC ...... 349/58, 65, 74, 83; 455/566, 567; 362/24, 362/88, 85; 361/679.01–679.45, 679.55–679.59
See application file for complete search history.

(56) References Cited

U.S. PATENT DOCUMENTS

| | | | |
|---|---|---|---|
| 6,704,004 B1 * | 3/2004 | Ostergård et al. | 345/170 |
| 7,117,011 B2 * | 10/2006 | Makino | 455/556.1 |
| 7,925,316 B2 * | 4/2011 | Hongo et al. | 455/575.3 |
| 2001/0048081 A1 | 12/2001 | Yagi | |
| 2005/0264889 A1 * | 12/2005 | Gotoh et al. | 359/599 |

FOREIGN PATENT DOCUMENTS

| | | | |
|---|---|---|---|
| JP | 07-306648 | | 11/1995 |
| JP | 07306648 A | * | 11/1995 |
| JP | 2001-320451 | | 11/2001 |
| JP | 2003-143268 | | 5/2003 |
| JP | 2005-143138 | | 6/2005 |
| JP | 2006-203460 | | 8/2006 |
| JP | 2006203460 A | * | 8/2006 |

OTHER PUBLICATIONS

Japanese Office Action issued Dec. 6, 2011 in corresponding Japanese Patent Application No. 2008-093086 (1 page English Translation).

Decision on Refusal issued May 15, 2012 in Corresponding Japanese Patent Application No. 2008-093086 (4 pages) (2 pages English Translation).

* cited by examiner

*Primary Examiner* — Jayprakash N Gandhi
*Assistant Examiner* — Nidhi Desai
(74) *Attorney, Agent, or Firm* — Staas & Halsey LLP (57) ABSTRACT

A mobile terminal device including a movable side housing having a movable side rear case, a fixed side housing connected to the movable side housing with a connection part. An emitting member is provided to the movable side rear case, and a curved panel that covers the emitting member is attached to the movable side rear case through a light shielding sheet member, wherein light shielding print part is formed on a back side near an illuminated part in the curved panel.

8 Claims, 6 Drawing Sheets

MOBILE TERMINAL DEVICE

CROSS-REFERENCE TO RELATED APPLICATIONS

This application is based upon and claims the benefit of priority of the prior Japanese patent application No. 2008-093086, filed on Mar. 31, 2008, the entire contents of which are incorporated herein by reference.

FIELD

The present invention relates to a mobile terminal device such as a mobile phone having a telephone function. The present invention relates to, for example, a mobile terminal device that improves its design by various illumination and the like.

BACKGROUND

Recently, multi-functionalizations of mobile phones have been developed remarkably. There is a mobile phone that improves an illumination effect as well as the functionality by flashing an icon indicating mail arrival on a display panel or a housing cover when a mail arrives. For example, Japanese Laid-Open Patent Publication No. 2001-320451 discloses the above-described mobile phone. In this manner, by the display having the improved illumination effect on the cover of the mobile phone or the like, both the design and the functionality may be improved.

For the display of an icon and the like by illumination, light shielding print part is applied to a movable rear case as a housing cover of the mobile phone. This makes it possible to perform the display by given illumination in the part to which the light shielding print part has been applied. The light shielding print part is black print printed on the back side of the movable rear case as a housing cover. For example, to perform the display indicating mail, the black print is provided to indicate a mail icon formed by cutting an edge. That is, the light shielding print part is applied to the back side of the movable rear case to shield an area other than the area to be displayed as a given display mode.

The light shielding print part is applied to the back side of the movable rear case as a housing cover to display a mail mode. However, print object of this light shielding print part is a flat part, so that it is difficult to provide the light shielding print part to a part formed in a curved surface shape. Therefore, the part other than an emitting part may not be shielded entirely by only the light shielding print part, and then light leakage occurs.

SUMMARY

Accordingly, it is an object in one aspect of the invention to provide a mobile terminal device that improves its design such as various illumination.

According to an aspect of the invention, a mobile terminal device including a movable side housing having a movable side rear case, a fixed side housing connected to the movable side housing with a connection part, an emitting member provided to the movable side rear case, and a curved panel that covers the emitting member and attached to the movable side rear case through a light shielding sheet member, wherein light shielding print part is formed on a back side near an illuminated part in the curved panel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
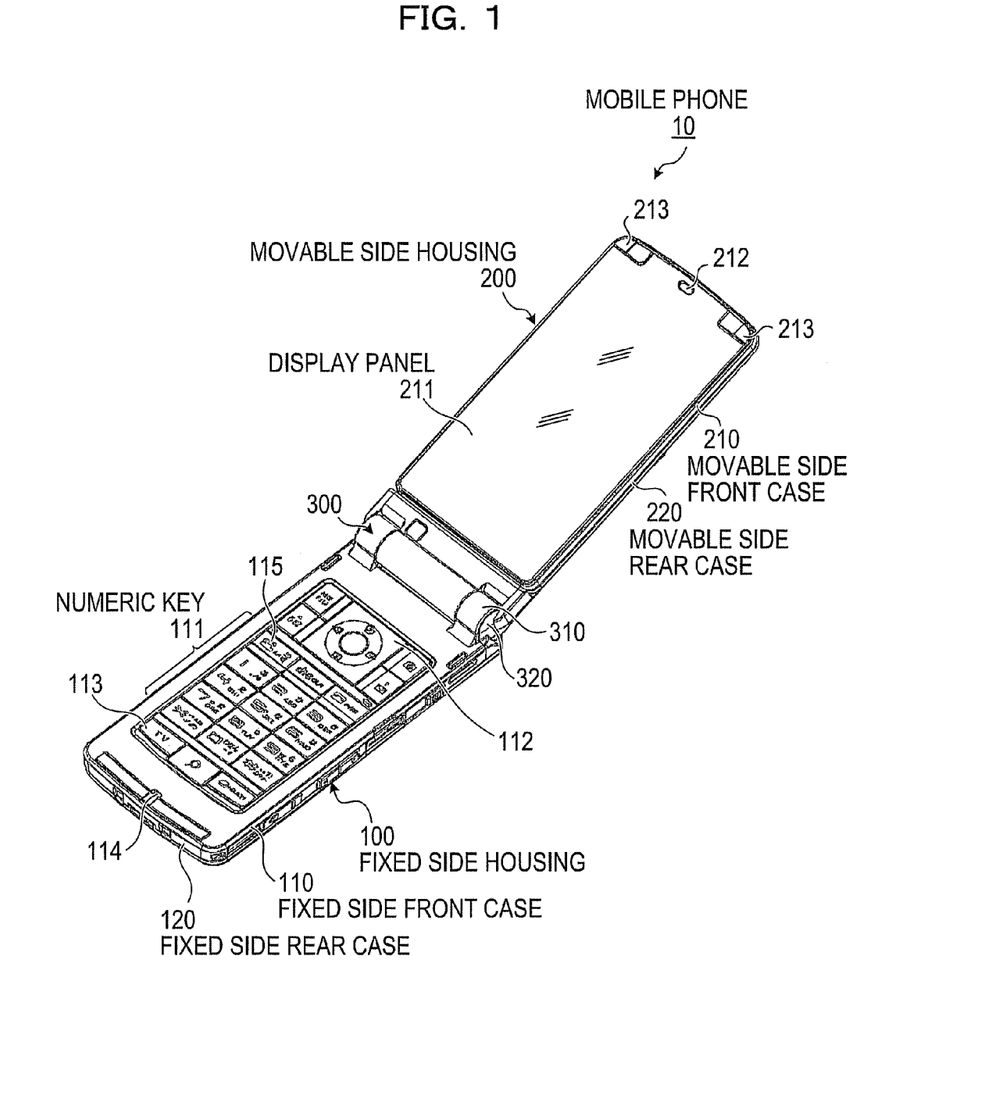
FIG. 1 is a perspective diagram illustrating a patulous state of a mobile phone according to a first embodiment.

An entire configuration of a mobile terminal device will be described by using FIG. 1. FIG. 1 is a perspective diagram illustrating a patulous state of a mobile phone according to a first embodiment. As illustrated in FIG. 1, a mobile phone 10 is formed by connecting a palm-size fixed side housing 100 and a movable side housing 200 by a connection part 300.

The mobile phone 10 has the fixed side housing 100 having operation keys such as a numeric key 111 having numeric keys with numbers 0 to 9 and various function keys such as a function key 112 for mode setting. The mobile phone 10 has the movable side housing 200 having an LCD module formed in the same size as the fixed side housing 100, and foldably connects the fixed side housing 100 and the movable side housing 200 by the connection part 300 having two hinges 310 and 320. The fixed side housing 100 and the movable side housing 200 are formed in a box shape. The material includes, for example, lightweight and high-strength magnesium alloy.

The fixed side housing 100 has a two-section structure having a fixed side front case 110 in which an operation panel 115 with various operation keys such as the numeric key 111 is arranged and a fixed side rear case 120 positioned on the back side thereon.

The fixed side front case 110 has the numeric key 111, the function key 112, a television phone key 113, and a mouthpiece 114 in which a microphone converting voice of a user into an electric signal is provided therein. The fixed side front case 110 and the fixed side rear case 120 are fixed at four positions respectively by screws.

The movable side housing 200 has a two-split structure having a movable side front case 210 in which a display panel 211 is allocated and a movable side rear case 220 positioned in the back side thereon. The movable side front case 210 is provided with an earpiece 212 by which a user of the mobile phone 10 listens to voice by attaching user's ear.

Figure 3:
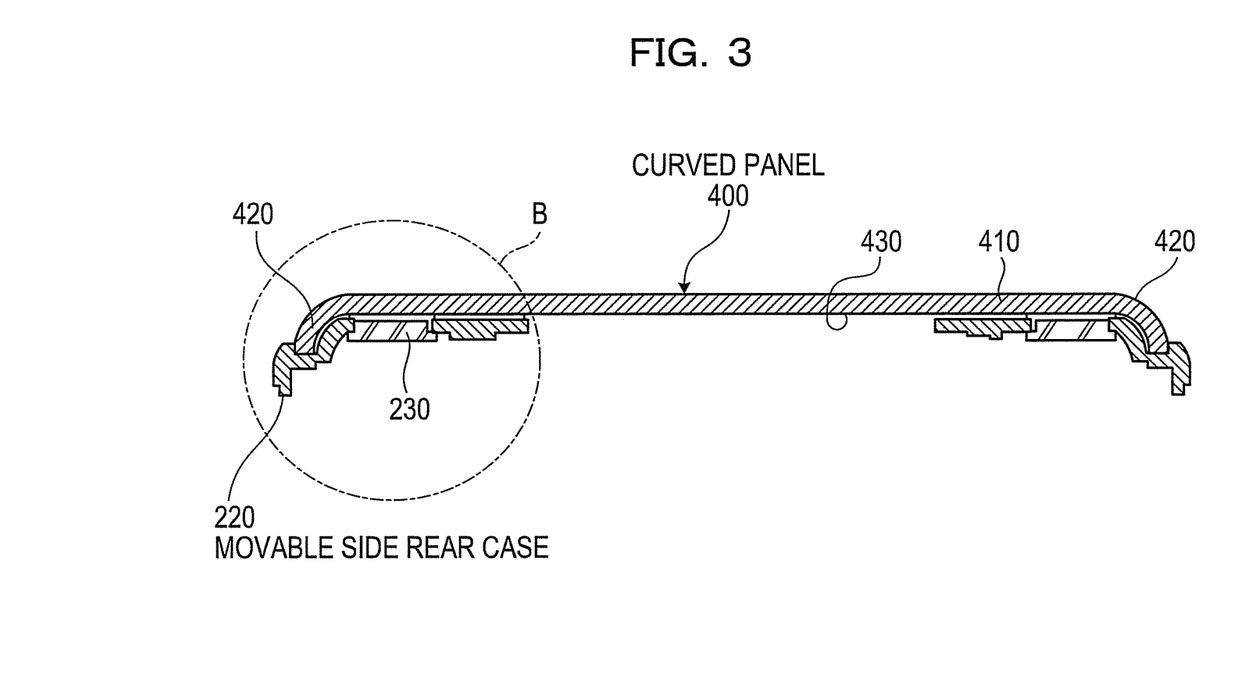
FIG. 3 is an A-A cross-section diagram of FIG. 2.

The movable side rear case 220 is provided with an emitting member 230 for emitting given illumination as illumination. The emitting member 230 is illustrated in FIG. 3. Both the movable side front case 210 and the movable side rear case 220 are fixed at four positions respectively by screws. The upper position of the display panel 211 is provided with blind covers 213 for the screws.

For the mobile phone 10 according to the first embodiment, the light shielding print part is applied to a back side 430 of a flat plate 410 as an illuminated part included in a curved panel 400 for displaying notification information such as e-mail as a given display mode. The given display mode is, for example, "Letter mark." The movable side rear case 220 and the curved panel 400 are pasted and fixed with each other through a shielding sheet member 500 having high light shielding ability. The light shielding sheet member 500 has a role as a double-faced adhesive tape.

The light shielding print part is applied to the back side 430 of the flat plate 410 near an illuminated part or section thereof of the curved panel 400 that is pasted to the movable side rear case 220 of the mobile phone 10. For other parts of the back side 430, shielding is performed by using the light shielding sheet member 500 used to fix the curved panel 400 to the movable side rear case 220. Accordingly, although the panel that performs the light shielding print part is the curved panel 400, the display may be performed on the curved panel 400 by various illumination.

Figure 2:
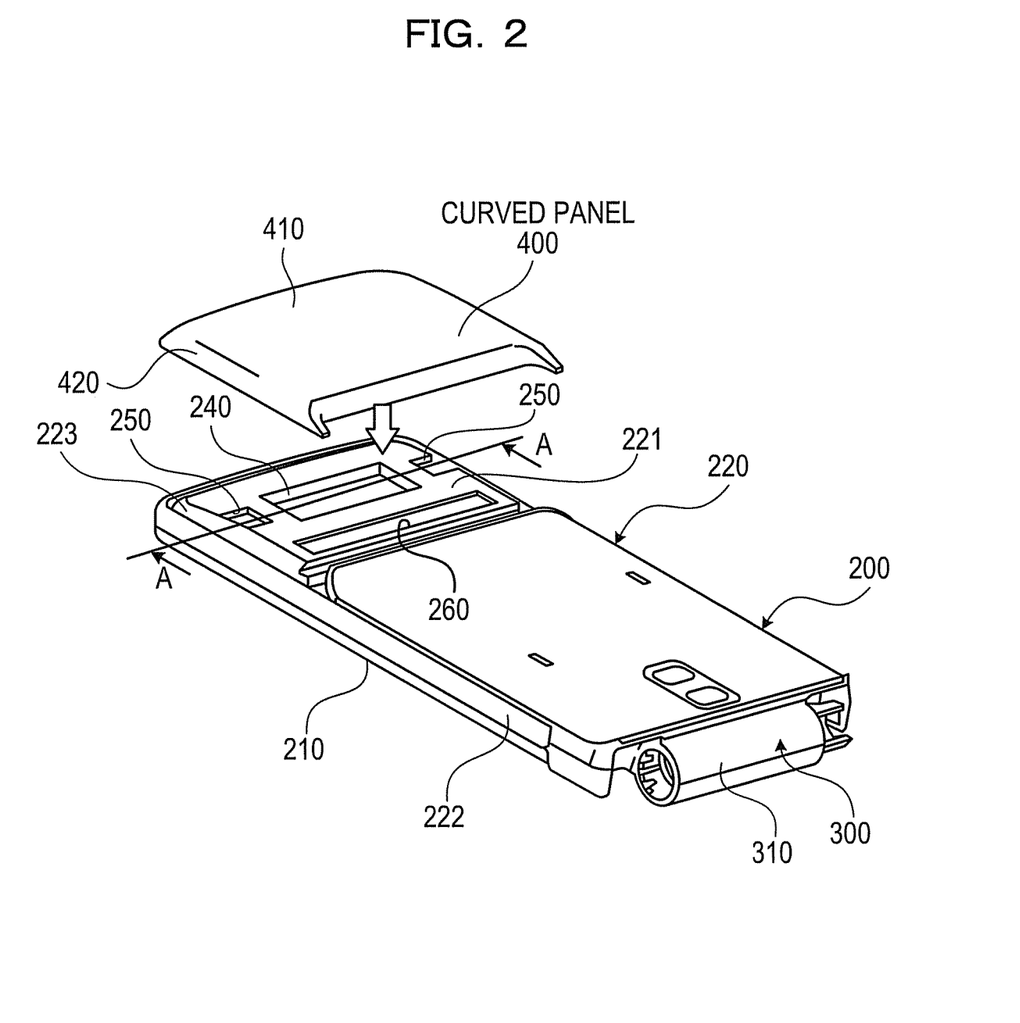
FIG. 2 is a perspective diagram illustrating a movable side housing and a curved panel illustrated in FIG. 1.
Figure 4:
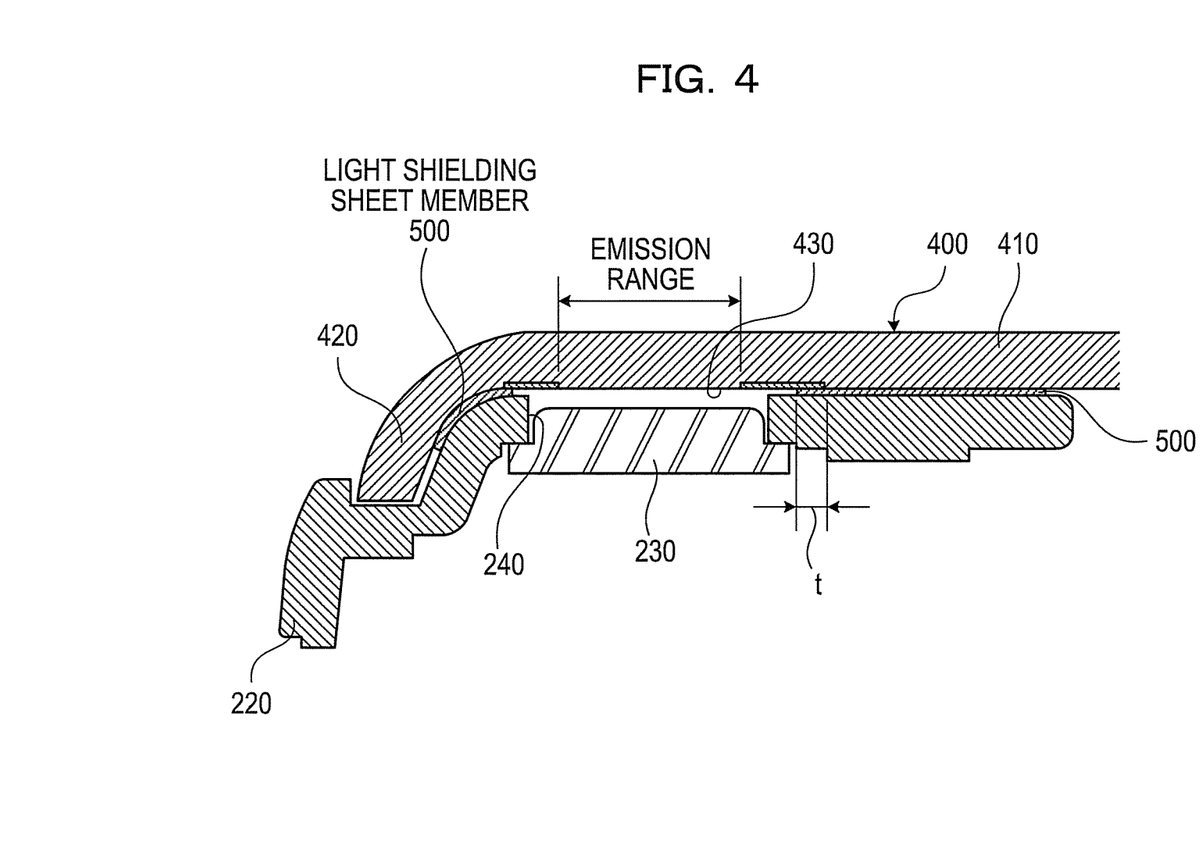
FIG. 4 is an enlarged cross-section diagram of part B of FIG. 3.
Figure 5:
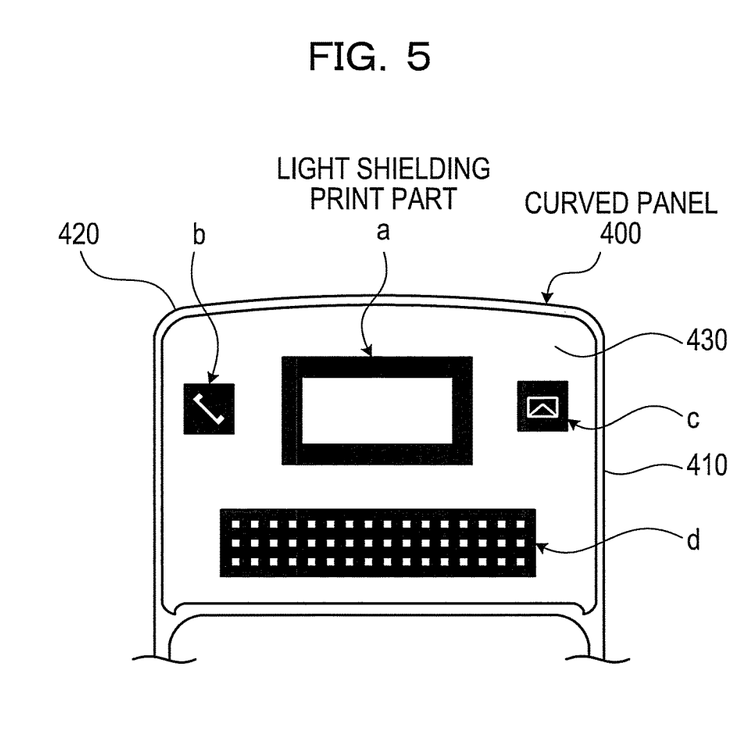
FIG. 5 is a plain view illustrating a light shielding print part.
Figure 6:
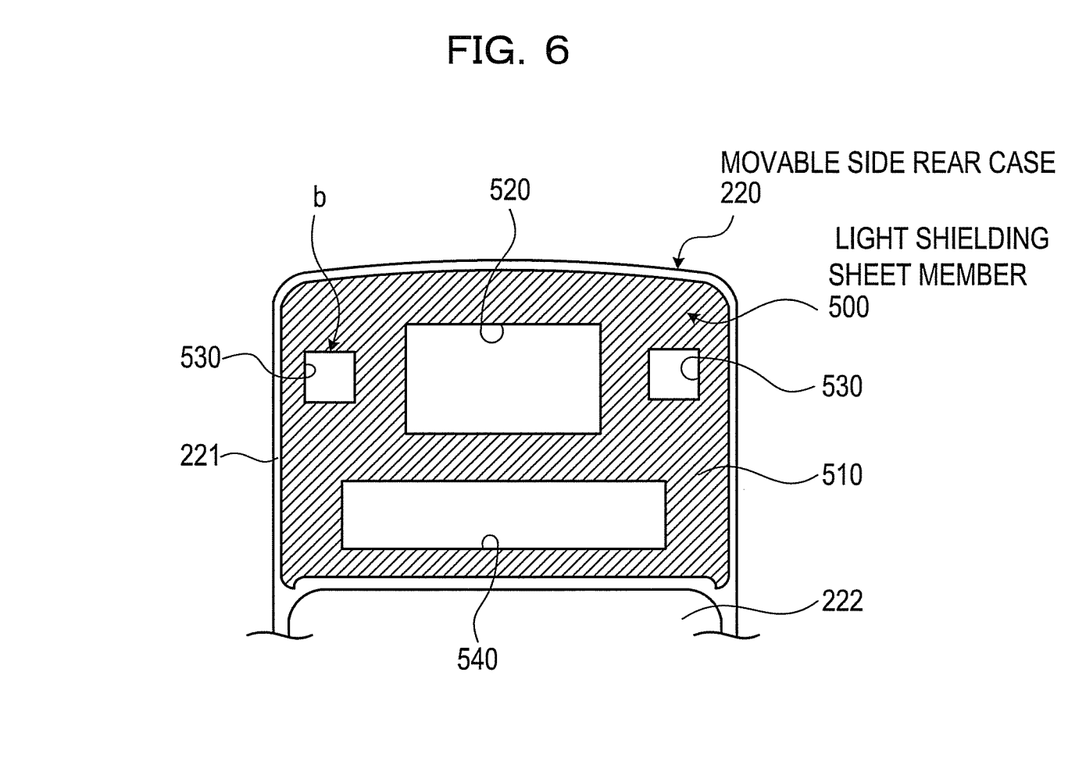
FIG. 6 is a diagram illustrating a shielding sheet member and an area where the light shielding sheet member is pasted.

By using FIG. 2 to FIG. 5, detailed description will be made below of the light shielding print part printed on the curved panel 400 of the movable side rear case 220 and of the light shielding sheet member 500. FIG. 2 is a perspective diagram illustrating a movable side rear case and a curved panel illustrated in FIG. 1, respectively. FIG. 2 illustrates an inverted diagram of the mobile phone 10. FIG. 3 illustrates A-A perspective diagram of FIG. 2. FIG. 4 illustrates B part-enlarged diagram of FIG. 3. FIG. 5 illustrates a flat diagram illustrating a light shielding print part. FIG. 6 is a diagram describing a light shielding sheet member and an area where the light shielding sheet member is pasted.

As illustrated in FIG. 2, the movable side rear case 220 includes a flat plate 221 shaped like a thin plate box and occupies almost all the areas, and includes a side plate 222 positioned around the flat plate 221. The lower half part of the movable side rear case 220 is an area where the curved panel 400 is attached. A groove part 223 is formed at an outer edge of the flat plate 221, and then the curved panel 400 is fixed to the groove part 223.

In a given position of the flat plate 221, an opening part 240 that is in a rectangular shape with a large diameter positioned at almost the center, an opening part 250 that is in a rectangular shape with a small diameter positioned at both sides of the opening part 240, and an opening part 260 that is in a long-length shape positioned at the lower side are formed. The light emitted by the emitting member 230 is displayed in a given display by the light shielding print part when the light passes upward from the opening parts 240, 250, and 260. The given display includes, for example, "Envelope mark" indicating e-mail.

The curved panel 400 is formed substantially in the same rectangular shape as the groove part 223 of the movable side rear case 220, and includes the flat plate 410 as an illuminated part of the curved panel 400 and a side plate 420 that is in a curved shape. As illustrated in FIG. 5, the light shielding print part is applied to shield areas a, b, c, and d of the back side 430 of the flat plate 410 of the curved panel 400. The shield areas a, b, c and d are near and/or surrounded by corresponding display mode opening parts of the light shielding sheet member 500.

The flat plate 221 included in the movable side rear case 220 and the flat plate 410 included in the curved panel 400 are pasted and fixed with each other through the light shielding sheet member 500 having high light shielding ability. The light shielding sheet member 500 is illustrated in FIG. 4.

The light shielding member 500 is a double-faced adhesive tape having an adhesive layer on both surfaces. In a body part 510 of the light shielding sheet member 500, a plurality of opening parts in a rectangular shape according to the display mode are formed. Concretely, as illustrated in FIG. 6, at almost the center of the light shielding sheet member 500, an opening part 520 that is in a rectangular shape with a large diameter, an opening part 530 that is in a rectangular shape with a small diameter positioned at the both sides of the opening part 520, and an opening part 540 that is in a long shape positioned at the lower part of the opening part 520 are formed, respectively.

The light shielding sheet member 500 is allocated in such a way that a shield area of light shielding print part printed on the back side 430 of the flat plate 410 of the curved panel 400 is overlapped with an area of the light shielding sheet member 500. As illustrated in FIG. 4, an area of the light shielding print part and an area of the light shielding sheet member 500 are an overlapped area (area t).

The light of the emitting member 230 may be prevented from leaking to the outside by allocating the attaching position of the light shielding sheet member 500 to be overlapped with an area of the light shielding print part. For example, it is possible to clearly display the edge part of the "Envelope mark" indicating e-mail presented as an illumination display.

The light shielding sheet member 500 has a three layer structure having a black sheet member made of a black material with high light shielding ability, a white sheet member made of a white material with high light diffusivity, and an adhesive sheet member having an adhesive layer. The light shielding sheet member 500 is pasted and fixed to the movable side rear case 220 through the adhesive sheet member. The mobile phone 10 may improve the light shielding ability by using a black material for the display side.

As described above, for the mobile phone 10 of the present first embodiment, the light shielding print part is applied to the back side 430 of the flat plate 410 in the curved panel 400 attached to the movable side rear case 220. In the mobile phone 10, the movable side rear case 220 and the curved panel 400 are pasted and fixed with each other through the light shielding sheet member 500 with high light shielding ability. Accordingly, the mobile phone 10 of the present first embodiment may display a complicated pattern by the panel in a curved shape. Therefore, the mobile phone 10 may achieve various illumination effects. Furthermore, the mobile phone 10 of the present first embodiment may efficiently illuminate the illuminated part by the light shielding print part by a small number of light sources.

Other Embodiments

According to an aspect of an embodiment of the invention, any combinations of the described features/elements, functions and/or operations can be provided. The present first embodiment has described an example applied to a mobile phone that is foldable by a hinge. The mobile phone of the present embodiment is also applicable to various hinge structures. For example, the present embodiment is applicable to a mobile phone that has a connection structure of a sliding type or a turning type.

The present first embodiment has described an example applied to a mobile phone as a mobile terminal device. The mobile phone of the present embodiment is also applicable to various mobile terminal devices such as a small-sized information processing/computing terminal like a Personal Digital Assistant (PDA), a small-sized music playing device, a portable television, and a portable game player.

According to an aspect of an embodiment, a portable computing device comprises a movable side housing; a fixed side housing connected to the movable side housing with a connection part; an emitting member provided in the movable side housing; a light shielding sheet member having a display opening for displaying information; and a curved panel that covers the emitting member and attached to the movable rear case by the light shielding sheet member. The curved panel includes an illuminated part corresponding to/aligned with the display opening of the light shielding sheet member and an applied light shielding print (e.g., painted, printed or pasted) surrounding the illuminated part on a back side facing the emitting member in the curved panel.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A mobile terminal device comprising:
    a movable side housing having a movable side rear case;
    a fixed side housing connected to the movable side housing with a connection part;
    an emitting member provided to the movable side rear case;
    a light shielding sheet member with opening parts corresponding to the emitting member; and
    a curved panel including an illuminated part to be illuminated by the emitting member and a back side that covers the emitting member and is attached to the movable side rear case through the light shielding sheet member,
    wherein a light shielding print part is formed on the back side of the curved panel,
    wherein the light shielding print part has a ring shape surrounding the illuminated part and an outer periphery of the ring shape of the light shielding print part is overlapped with a part of the light shielding sheet member, thereby the light shielding sheet member having an area which is not overlapped with the light shielding print part.

2. The mobile terminal device according to claim 1, wherein at least a portion of the light shielding print part is provided between the curved panel and the light shielding sheet member.

3. The mobile terminal device according to claim 1, wherein the light shielding sheet member is a double-faced adhesive tape member having light shielding ability in which an adhesive layer is formed on both surfaces therein.

4. The mobile terminal device according to claim 1, wherein the light shielding sheet member has a three-layer structure having a black sheet member made of a black material with high light shielding ability, a white sheet member made of a white material with high light diffusivity, and an adhesive sheet member with an adhesive layer.

5. The mobile terminal device according to claim 1, wherein the curved panel includes a flat plate and a side plate including a curved shape, and the light shielding print part is formed within the flat plate.

6. The mobile terminal decide according to claim 1, wherein the curved panel includes a flat plate and a side plate including a curved shape, and the area is provided at the side plate.

7. A portable computing device comprising:
    a movable side housing having a movable side rear case;
    a fixed side housing connected to the movable side housing with a connection part;
    an emitting member provided in the movable side housing;
    a light shielding sheet member having a display opening corresponding to the emitting member and for displaying information; and
    a curved panel including an illuminated part to be illuminated by the emitting member and a back side that covers the emitting member and attached to the movable side rear case by the light shielding sheet member,
    wherein a light shielding print surrounds the illuminated part on the back side in the curved panel and an outer periphery of a part of the light shielding print part that surrounds the illuminated part is overlapped with a part of the light shielding sheet member, thereby the light shielding sheet member having an area which is not overlapped with the light shielding print.

8. The portable computing device according to claim 7, wherein the curved panel includes a flat plate and a side plate including a curved shape, and the area is provided at the side plate.

* * * * *

UNITED STATES PATENT AND TRADEMARK OFFICE
CERTIFICATE OF CORRECTION

PATENT NO. : 8,467,172 B2
APPLICATION NO. : 12/401197
DATED : June 18, 2013
INVENTOR(S) : Kenta Sugimori et al.

Page 1 of 1

It is certified that error appears in the above-identified patent and that said Letters Patent is hereby corrected as shown below:

In the Claims

Column 6, Line 19, In Claim 6, delete "decide" and insert -- device --, therefor.

Signed and Sealed this
Twenty-fourth Day of September, 2013

Teresa Stanek Rea
*Deputy Director of the United States Patent and Trademark Office*